W. T. GARRATT.
Improvement in Lubricators.
No. 133,217. Patented Nov. 19, 1872.
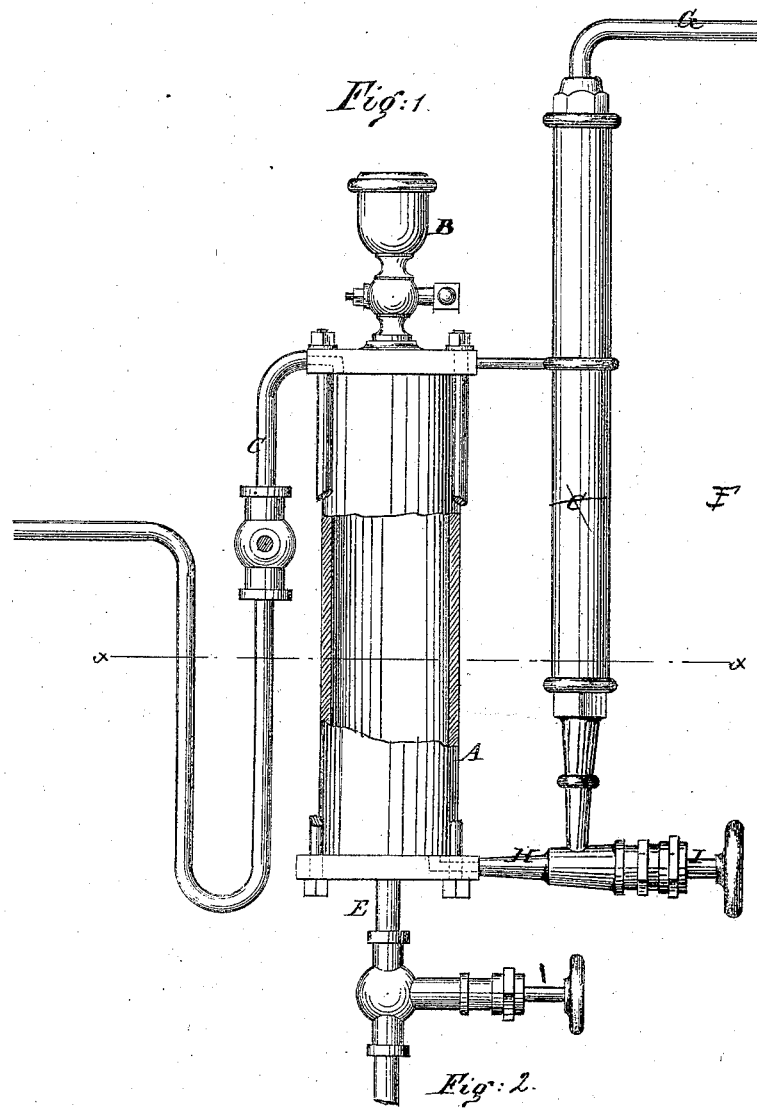
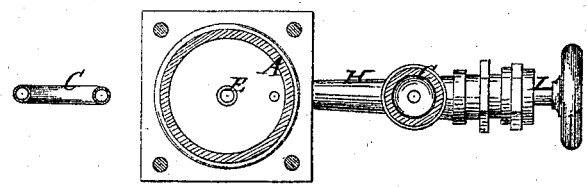

UNITED STATES PATENT OFFICE.

WILLIAM T. GARRATT, OF SAN FRANCISCO, CALIFORNIA.

IMPROVEMENT IN LUBRICATORS.

Specification forming part of Letters Patent No. 133,217, dated November 19, 1872.

*To all whom it may concern:*

Be it known that I, WILLIAM T. GARRATT, of San Francisco, in the county of San Francisco and State of California, have invented certain Improvements in Lubricators, of which the following is a specification:

My invention consists in a combination of a condensing-tube and certain regulating cocks or valves with that class of lubricators in which steam-pressure has heretofore been used to force the oil from the holder to the place to be lubricated; the object of the said improvement being to permit the direct application of the steam to the oil by the water of condensation interposed between, and to limit or regulate the hydrostatic pressure, all as hereinafter described.

Figure 1 is partly a side elevation and partly a sectional elevation of my improved oiler, and Fig. 2 is a horizontal section of Fig. 1 on the line *x x*.

A is a metallic or glass oil-holding cylinder, which may be of any suitable kind, with a filling-cup, B, at the top. C is the tube leading from the top of the said holder to the valve-chest, journal, or other part where it is desired to inject or deposit the lubricant. E is a pipe for withdrawing water from the vessel A from time to time as it becomes filled, said pipe being provided with a cock for closing it. F is the condenser, which consists of a vertical cylinder, or other-shaped vessel, arranged with the holder A, but extending a little higher than vessel A, and having a pipe-connection, G, at the top with the steam pipe or boiler. The lower end is connected with the bottom of the holder A by a connection, H, provided with a valve or cock, I, for checking the flow into the vessel A, or closing it altogether.

The essential feature of my invention is the arrangement of the condensing-pipe and cock, to supply the lubricator with water, in such manner that the water will not be forced into the oil-chamber by steam-pressure, so that the pressure operating to eject the oil will only be that due to the weight of the column of water in the condenser, or thereabout, so as to flow in by virtue of its gravity only, and expel the oil by the same force. This control of the induction-passage is of vital importance, not only on account of limiting the force of the water column, but because it saves the necessity of gaging the flow of oil through the cock in pipe C, which is objectionable, because when contracted it is liable to choke by the gummy nature of the oil and the collection of foreign matters therein, while the cock I is not so liable to choke, as the water of condensation is pure and not gummy in its nature. In my instrument the exit-valve is generally wide open, so that the oil is not subject to choke, which cannot be permitted in any instrument not having a valve between the steam-boiler and the holder, because the oil would be forced out at once.

By my arrangement, when applied to the lubrication of journals and other like parts where there is no back pressure, the oil-chamber and its attachments are subjected to no greater pressure than the simple weight of the contained lubricant and the water, whereby destruction of joints and leakage are avoided.

My arrangement of the condensing pipe or attachment to rise higher than the holder is of great importance to the efficiency of the lubricator, whether employed in connection with steam-cylinders, journals, or other parts to be lubricated, for without such provision the lubricant could not be used until steam-pressure had first been obtained.

Having thus described my invention, I claim as new and desire to secure by Letters Patent—

A condensing pipe or vessel, F, in combination with lubricator A, when said condenser extends higher than the lubricator, is connected to the latter at the bottom, and a cock or valve, I, is arranged in the connection of the said condenser with the lubricator, all substantially as specified.

W. T. GARRATT.

Witnesses:
WM. BURNETT,
F. I. THIBAULT.